2,752,314
// Patented June 26, 1956

2,752,314

EXTRACTION OF ANTIOXIDANT FROM OSAGE ORANGE FRUIT

John R. Clopton, Boulder, Colo., assignor of one-half to Texas Research Foundation, Renner, Tex., a corporation of Texas No Drawing. Application January 9, 1953,
Serial No. 330,585

9 Claims. (Cl. 252—398)

This invention relates to the prevention of oxidation and relates more particularly to the prevention of oxidative deterioration of organic materials.

Many organic materials are subject to oxidative deterioration with consequent spoilage, development of rancidity, change in composition, or other deleterious effects, and its has been recognized that oxidative deterioration may be retarded in many cases by the use of suitable antioxidants. Thus, foods, hydrocarbon motor fuels, rubber, and other organic materials have been protected against the onset of oxidative deterioration and the rate of oxidative deterioration lowered by incorporating therein or otherwise associating therewith one or several of a variety of antioxidants. The various antioxidants differ in their ability to retard oxidative deterioration and the selection of a particular antioxidant is made on this basis as well as on the basis of cost and on the basis of compatibility with the intended use of the organic material. While a particular antioxidant may be suitable with respect to some of these bases, it may not be suitable with respect to other of these bases. Thus, a particular antioxidant may be suitable with respect to its antioxidative effect and compatibility with the intended use of the organic material but its cost may be undesirably high. On the other hand, a particular antioxidant may be suitable with respect to its antioxidative effect and its cost but it may not be compatible with the intended use of the organic material, or it may be suitable with respect to cost and compatibility with the intended use of the organic material but it may leave much to be desired with respect to antioxidative effect. In connection with foods, compatibility of an antioxidant, particularly edibility of the antioxidant, is all important, and natural antioxidants from animal or vegetable sources are to be preferred for this reason.

It is an object of this invention to retard oxidative deterioration of organic materials. It is another object of this invention to provide an edible, vegetable antioxidant for foods. It is another object of this invention to provide an economical method of retarding oxidative deterioration of organic materials. It is a further object of this invention to provide an oil- and fat-soluble antioxidant for organic materials. These and other objects of this invention will become apparent from the following description thereof.

In accordance with the invention, there is incorporated with an organic material subject to oxidative deterioration a fat-soluble antioxidative substance derived from the fruit of the Osage orange. By "fat-soluble," I mean soluble in fats and in solvents capable of dissolving fats but insoluble in water.

The Osage orange is a tree belonging to the mulberry family (Moraceae). It is known botanically as *Maclura pomifera, Maclura aurantiaca, Toxylon pomiferum,* and *Ioxylon pomiferum.* The mature fruit is greenish yellow in color, averages about four inches in diameter and two to three pounds in weight, and consists of a rather dense central core, fruit bulk surrounding the core, seeds imbedded within the fruit bulk, sap, and granular deposits of pigment.

I have found that the fruit of the Osage orange contains a fat-soluble substance or principal that is a highly effective antioxidant for organic materials subject to oxidative deterioration. Further, since the Osage orange tree grows extensively through the Southern, Midwestern, and Eastern United States and since the fruit has received little attention from an industrial standpoint, the cost of the fruit is low. Additionally, while the fruit is not eaten as a food by man because of insipidity and fibrous nature, it is edible and has been successfully employed as a feed for animals. Thus, there is provided an effective, low cost, edible antioxidant. Furthermore, the antioxidant does not impart taste, or other objectionable characteristic to the organic material with which it is incorporated.

In the practice of the invention, dried Osage orange fruit, or a selected portion thereof, as will be explained in greater detail hereinafter, may be incorporated directly with the organic material subject to oxidative deterioration, or an extract of the dried fruit, or a selected portion thereof, obtained by a procedure involving extraction with a solvent capable of dissolving fats, may be incorporated with the organic material subject to oxidative deterioration. Fresh Osage orange fruit contains about 80% by weight of water and, as I have found, it is necessary to remove at least the greater amount of the water contained therein by a procedure involving heating to a temperature of at least 60° C. in order to obtain the antioxidative effect of the fruit or the extract thereof. For drying the fruit, any suitable procedure involving heating to a temperature of at least 60° C. may be employed. Thus, the fruit may be dried, for example, in a vacuum oven at a temperature of about 80° C. or in an air oven at a temperature of about 120° C. Higher temperatures of drying may be employed if desired since the antioxidative substance in the fruit is stable up to a temperature of at least 150° C. It is not essential that the entire amount of water be removed from the fruit, but it is preferred to remove as much water as possible from a practical standpoint, such as about 95% or more of the water.

The whole dried fruit may be admixed with the organic material subject to oxidative deterioration, if the organic material is of such character that the whole dried fruit or the antioxidative substance therein may be admixed uniformly and effectively therewith. However, where the fruit is admixed with the organic material, it is preferred to pulverize the fruit and admix the pulverized fruit with the organic material. Pulverizing may be effected prior to drying, but it is preferred to effect pulverizing subsequent to drying because of the greater ease of pulverizing the dried fruit. Pulverizing may be effected in any desired manner. For example, the dried fruit may be pulverized in a Wiley mill, or in various types of hammer mills.

It has been found that the antioxidative substance is not distributed uniformly throughout the fruit but is concentrated primarily in the fruit bulk, there being little or none of the antioxidative substance in the core, seeds, or sap. Accordingly, prior or subsequent to drying and prior to pulverizing, if pulverizing is desired, the fruit bulk may be separated from the core and seeds. However, the presence of the core or seeds, and the sap, with the fruit bulk merely adds to the volume and weight of the dried fruit admixed with the organic material subject to oxidative deterioration and the separation of the core and seeds from the fruit bulk need not be effected unless the additional volume and weight of the dried fruit is sufficiently undesirable to outweigh the operational steps involved in the separation procedure.

Where the organic material is such that the presence of the dried fruit therein is unobjectionable from the standpoint of appearance or otherwise, the dried fruit may be permitted to remain therein. However, in the case of organic materials, such as lard or cottonseed oil, the presence of the solid particles of the dried fruit is objectionable from the standpoint of appearance. In the case of solid organic materials which are oleaginous and can be heated to the liquid state, the solid organic material, after addition of the dried fruit, may be heated to the liquid state, and, since the antioxidative substance is oil-soluble, the antioxidative substance will be extracted from the dried fruit, after which the undissolved fruit material may be filtered from the liquid. Preferably, however, where the dried fruit is to be added to an oleaginous, solid organic material that can be heated to the liquid state, the solid material is first heated to the liquid state and the dried fruit added thereto, after which the undissolved fruit material is filtered therefrom. A solid organic material capable of dissolving may be treated with the pulverized fruit by dissolving in a suitable solvent that can subsequently be removed from the dissolved organic material, adding the dried fruit to the solution, thereafter filtering the undissolved fruit material therefrom, and then separating the solvent from the solution, as by evaporation of the solvent. In the case of an oleaginous liquid, or other liquid organic material capable of dissolving oil-soluble substances, the undissolved dried fruit may be simply removed therefrom as by filtration.

It is preferred, however, to incorporate with the organic material subject to oxidative deterioration an extract of the dried Osage orange fruit. By "extract" of dried Osage orange fruit, I mean the material obtained from the dried Osage orange fruit by extraction with a solvent in which fats are soluble. The extract may be in solution in the solvent employed for extraction of the fruit, in solution in the solvent employed for extraction of the fruit where the solvent is admixed later with another solvent or other solvents whether or not capable of dissolving fats, in solution in a solvent or solvents other than the solvent employed for extraction of the fruit, or partially or completely free of any solvent, or the extract may be purified.

For obtaining the extract of dried Osage orange fruit, the extraction of the fruit may be effected employing any type of solvent capable of dissolving fats. Examples of suitable solvents are: oxygenated organic compounds, including ketones such as acetone, ethers such as ethyl ether, dioxane, and dipropylene glycol, alcohols such as methanol, ethanol, isopropanol, and glycerol; hydrocarbons such as benzene, isohexane, and petroleum ether; chlorinated hydrocarbons such as carbon tetrachloride; and glycerides such as lard, cottonseed oil, linseed oil, and olive oil. Mixtures of solvents may also be employed. Preferred solvents are acetone, ethyl ether, benzene, petroleum ether, and carbon tetrachloride. Extraction may be effected in any suitable manner, as by batch mixing of the dried fruit with the solvent in a single or in multiple stages with drainage of part or all of the solvent from the fruit following each stage, percolation of the solvent or solvents through a body of the dried fruit, or countercurrent passage of the dried fruit and the solvent or solvents through an extractor. Extraction procedures such as those carried out in Soxhlet and Butt-type extractors may be employed. Temperatures of extraction may be as desired. The whole dried fruit may be subjected to extraction although it is preferred to pulverize the dried fruit prior to extraction in order to increase the rate and efficiency of the extraction. If desired, extraction of only the fruit bulk may be effected, the core and the seeds being discarded in order to reduce the volume of material being extracted.

Where the organic material subject to oxidative deterioration may be admixed with a solution, the solution of extract obtained by extraction of the dried fruit may be admixed directly with the organic material. However, the solvent employed in obtaining the solution of extract must be compatible with the organic material and, accordingly, where the solution of extract obtained by extraction of the dried fruit is to be admixed directly with the organic material subject to oxidative deterioration, the selection of the solvent employed for extraction must be made taking into consideration its compatibility with the organic material. Where it is desired to admix the organic material directly with the solution of extract obtained by extraction of the dried fruit but it is not desired that the solvent remain with the organic material, the solvent for extraction of the dried fruit may be selected taking into consideration its ease of removal from the organic material subject to oxidative deterioration. Thus, for example, where the solution of extract obtained by extraction of the dried fruit is to be admixed with a solid, organic material but it is desired that the solid, organic material be in association with the solvent only temporarily, the solvent selected for extraction of the dried fruit may be a highly volatile solvent such as ethyl ether or ethanol whereby the solvent may be readily removed by evaporation from the solid organic material after admixture of the solution therewith. On the other hand, where it is desired to admix the organic material subject to oxidative deterioration with a solution of extract, but not necessarily the solution of extract obtained directly by extraction of the dried fruit, the solvent selected for extraction may be one that may be readily separated from the extract whereby the extract may be obtained free of the solvent and redissolved in another solvent, and this latter solution admixed with the organic material subject to oxidative deterioration. Similarly, where the extract free of any solvent is to be admixed with the organic material subject to oxidative deterioration, the selection of the solvent for extraction of the dried fruit may be made taking into consideration its ease of separation from the extract.

In many instances, the organic material subject to oxidative deterioration may itself be employed as the solvent for extraction of the dried fruit, as indicated hereinabove in connection with the admixture of the dried fruit per se with liquid oleaginous materials or solid oleaginous materials that can be converted to the liquid state. In the case of oils subject to oxidative deterioration, such as cottonseed oil, for example, cottonseed oil may be employed as the solvent for extraction of the dried fruit and the oil solution of extract admixed as a concentrate with cottonseed oil to be protected against oxidative deterioration. Similarly, in the case of solid organic materials that may be converted to the liquid state, such as lard, for example, the solid organic material may be converted to the liquid state and the liquid employed as the solvent for extraction of the dried fruit, after which the extract in lard may be admixed as a concentrate with lard to be protected against oxidative deterioration.

Extraction of the dried fruit with a solvent in which fats are soluble removes from the fruit not only the antioxidative substance or principal present in the fruit but also removes various resins, pigments, and other fat-soluble materials. These other materials are present in the solution of extract along with the antioxidative substance or principal and, depending upon the solvent, may be in sufficient concentration that the extract, upon removal of the solvent therefrom, will be a dark, somewhat viscous liquid from which crystalline material containing the antioxidative substance will separate upon standing for several days. It is preferred, in order to obtain the greater antioxidative effect per unit amount of antioxidant substance derived from the dried Osage orange fruit employed, to admix with the organic material subject to oxidative deterioration a purified extract of the dried fruit. Purification of the extract may be effected by recrystallization of the extract in the same solvent employed for extraction of the dried fruit or from other solvents.

In connection with purification of the extract, various of the solvents which may be employed for extraction of the dried fruit may be better solvents for the fat-soluble resins and pigments contained in the fruit than for the antioxidative substance, although they will otherwise be effective solvents for the antioxidative substance and may be even preferred solvents for extraction because of economy, ease of handling, or otherwise. Where such solvents are employed for extraction of the dried fruit, they may also be used to wash the crystallized extract, after removal of the extracting solvent, to remove the resins and the pigments from the extract, with only slight, if any, loss of the antioxidative substance, depending upon the amount of washing solvent employed. Thus, petroleum ether which is an effective solvent for extraction of the dried fruit, may be employed for extraction of the dried fruit, the petroleum ether may be evaporated from the extract, and after crystallization of the extract has occurred, the crystals may be washed free of the uncrystallized portion of the extract, using, of course, an amount of petroleum ether small compared to the amount employed for extraction of the dried fruit. Recrystallization may be effected by dissolving the crystals of extract in sufficient petroleum ether, evaporating the solvent from the solution until crystallization occurs, and removing the crystals from the mother liquor. Recrystallization may also be effected by dissolving the crystals in a small amount of another type of solvent such as acetone or ethanol in which the crystals are more soluble than in petroleum ether, adding petroleum ether to the solution in amounts to effect crystallization, and removing the crystals from the mother liquor. Recrystallization may be repeated as often as desired although one recrystallization will generally be satisfactory.

The purified extract per se or a solution of the purified extract may be incorporated with the organic material subject to oxidative deterioration.

The invention may be employed for the treatment of various organic materials subject to oxidative deterioration. Included among these materials are hydrocarbons or hydrocarbon-containing materials, such as gasolines, greases, and rubber. Also included among these materials are fatty acid esters such as lipids, waxes, and glycerides such as the normally liquid glycerides including cottonseed oil, castor oil, soybean oil, peanut oil, essential oils, and other liquid vegetable oils, and cod liver oil and other normally liquid fish oils, and the normally solid glycerides including butter, lard, and other normally solid animal fats. Other organic materials which may be treated in accordance with the invention include hydrogenated vegetable oils, such as hydrogenated soybean oil and hydrogenated lard. Further materials which may be treated in accordance with the invention include butter and oleomargarine. Various other organic materials subject to oxidative deterioration which may be treated in accordance with the invention include cereals, flours, potato chips, doughnuts, baked goods premixes, vitamins, and vitamin preparations. Of these materials, the invention is particularly effective for the treatment of fatty acid esters, liquid hydrocarbons, rubber, essential oils, and vitamins.

The dried fruit or an extract or solution of extract thereof may be incorporated with the oxidative substance subject to oxidative deterioration, as previously stated. The amount of any of these to be incorporated with the organic material depends upon the concentration of the antioxidative substance or principal therein, the type of organic material, and the extent of retardation of oxidative deterioration desired. Generally, however, satisfactory results are obtained with the dried fruit where the amount is between about 0.1 and 1.5 percent by weight of the organic material, with a purified extract or solution thereof where the amount is between about .01 and 0.1 percent by weight of the organic material, and with unpurified extract or solution thereof where the amount is between about .03 and 0.3 percent by weight of the organic material.

The effect of the antioxidative substance derived from Osage orange fruit in retarding the onset and rate of oxidative deterioration of organic materials may be increased by employing the antioxidative substance in conjunction with various synergists. These materials may have little or no antioxidative effect on the organic materials to which they are added but operate to enhance the effect of the antioxidative substance derived from the fruit. Suitable synergists include tartaric acid, pyruvic acid, phosphoric acid, oxalic acid, 1-malic acid, fumaric acid, citric acid, d-isoascorbic acid, and ascorbic acid. However, other synergists may also be employed.

The following examples will be illustrative of the invention.

EXAMPLE I

This example will illustrate the antioxidative effect obtained by incorporating dried Osage orange fruit bulk with organic material subject to oxidative deterioration.

Osage orange fruit was dried in an air oven at 120° C. until the fruit had decreased to about 20% of its original weight, which represented removal of approximately 95% of the original moisture. The fruit bulk was separated by hand from the seeds, core, and sap, and the fruit bulk was ground to 20 mesh in a Wiley mill. The ground material was admixed with three samples of lard in various concentrations and each sample was heated on a steam bath for about 15 minutes to melt the lard, after which the samples were stirred. The three samples, along with a sample of the untreated lard, were tested for their stability against oxidative deterioration by the Active Oxygen Method (AOM), which method comprises aerating the samples at a constant rate while maintaining their temperature at 98° C. until oxidative deterioration occurs as shown by the peroxide value of the sample and organoleptic evaluation. The results are given in the table which lists the concentration of dried fruit bulk in each sample and the time that each sample remained stable against oxidative deterioration.

*Table I*

| Concentration of Dried Fruit Bulk, Percent by Weight of Lard | AOM Stability, Hours |
|---|---|
| 0 | 4.5 |
| 0.33 | 43.5 |
| 0.67 | 70.5 |
| 1.33 | 106.0 |

EXAMPLE II

In this example, there is illustrated the antioxidative effect obtained by incorporating dried Osage orange fruit bulk with organic material subject to oxidative deterioration, dissolving the antioxidative substance from the fruit bulk in the organic material, and thereafter separating the fruit bulk from the organic material.

Osage orange fruit bulk, prepared in the same manner as described in Example I, was admixed in different concentrations with three samples of lard, after which each sample was heated on a steam bath for 15 minutes to the melting point. The melted samples were stirred, the sample containing the largest concentration of dried fruit bulk was heated to 150° C. for a period of 5 minutes, and the three samples were then filtered to remove the dried fruit bulk therefrom. The samples, along with an untreated sample of the lard, were then tested by the Active Oxygen Method for stability against oxidative deterioration. The table gives the amount of dried fruit bulk admixed with each sample and the time that each sample remained stable against oxidative deterioration.

Table II

| Concentration of Dried Fruit Bulk, Percent by Weight of Lard | AOM Stability, Hours |
| --- | --- |
| 0 | 4.0 |
| 0.33 | 36.5 |
| 0.67 | 55.5 |
| 1.33 | 91.5 |

EXAMPLE III

This example will indicate the antioxidative effect of solutions of extract obtained from dried Osage orange fruit by extraction with various solvents, removal of solvent from each of the extracts, and solution of each of the extracts in another solvent.

Osage orange fruit was dried in the same manner as described in Example I and the whole dried fruit was ground to 20 mesh in a Wiley mill. Separate samples of the ground dried fruit were extracted to a Soxhlet extractor with various solvents and each solution of extract was thereafter heated to remove the solvent therefrom. Each extract, after removal of the solvent, was taken up in an amount of dipropylene glycol such that each solution contained 10% by weight of the extract, and each solution was then admixed with lard in an amount such that the lard contained 0.1% by weight of the extract. The lard samples were heated to the liquid state, stirred, and thereafter tested for stability against oxidative deterioration by the Active Oxygen Method.

A second series of solutions of extract in dipropylene glycol were similarly prepared from Osage orange fruit dried at 80° C. in a vacuum oven, the solutions of extract were similarly added to separate samples of lard, and the stability of the lard samples against oxidative deterioration was similarly tested.

The table gives the solvent employed for extraction of the dried fruit, the manner of drying the fruit, and the time that each lard sample remained stable against oxidative deterioration. The table also gives the time an untreated sample of the lard and a sample of the lard containing the same amount of dipropylene glycol remained stable against oxidative deterioration.

Table III

| Solvent | AOM Stability, Hours | |
| --- | --- | --- |
|  | Fruit Dried at 120° C. in Air Oven | Fruit Dried at 80° C. in Vacuum Oven |
| Acetone | 42.0 | 38.5 |
| Di-ethly ether | 53.0 | 50.0 |
| Dioxane | 63.0 | 38.5 |
| Carbon Tetrachloride | 40.0 | 45.5 |
| Benzene | 67.0 | 55.0 |
| Petroleum Ether | 34.5 | 20.0 |
| Ethanol | 42.5 | 36.5 |
| Isopropanol | 48.0 | 39.0 |

(Stability of untreated lard, 4 hours).
(Stability of lard containing dipropylene glycol, 5 hours).

It will be noted from the above table that the antioxidative effects of the dipropylene glycol solutions of extract varied with the solvent employed for extracting the fruit. However, each of the dipropylene glycol solutions of extract contained 10% by weight of the extract and the extract contained the antioxidative substance extracted from the fruit plus varying amounts of fat-soluble resins and pigments depending upon their solubility in the solvent employed for extraction of the fruit. Accordingly, the differences in stability of the various lard samples are not due so much to the relative efficiencies of the solvents for extracting the antioxidative substance from the fruit as to their efficiencies for extracting extraneous fat-soluble resins and pigments from the fruit.

EXAMPLE IV

The antioxidative effect of a solution of extract obtained by extracting Osage orange fruit with dipropylene glycol is illustrated in this example.

Osage orange fruit was dried at 120° C. in an air oven and the fruit was thereafter ground to 20 mesh in a Wiley mill. The fruit was extracted with twice its weight of dipropylene glycol, the resulting solution of extract was added in the amount of 0.1% by weight to a sample of lard warmed to the liquid state, the sample was stirred, and thereafter its stability was determined by the Active Oxygen Method. The same procedure was repeated except that the Osage orange fruit was dried at 80° C. in a vacuum oven.

The time of stability of the lard treated with the solution of extract obtained from the fruit dried at 120° C. in the air oven and from the fruit dried at 80° C. in the vacuum oven was 55.5 hours and 56.0 hours, respectively. The time of stability of untreated lard was 4.5 hours. The time of stability of lard treated with the same amount of dipropylene glycol was 5 hours.

EXAMPLE V

This example will be illustrative of the results to be obtained by incorporating a purified extract of Osage orange fruit with various organic materials subject to oxidative deterioration.

Osage orange fruit was dried at 120° C. in an air oven and after grinding to 20 mesh was exhaustively extracted in a Soxhlet extractor with petroleum ether. The solution of extract obtained was allowed to stand for three days by which time crystals separated in such bulk that most of the remaining liquid components of the solution of extract were enmeshed in a crystal mass. The crystal mass was washed with petroleum ether in just sufficient amounts to remove the liquid components therefrom, the crystals were dissolved in ethanol, and petroleum ether was added to the ethanol solution until the crystals reformed. The solvent was then poured off from the mixture and the residual purified extract was dried. The purified extract was then mixed in varying amounts with various organic materials subject to oxidative deterioration and the stability of each was measured thereafter by the Active Oxygen Method. The stability of a sample of each organic material prior to addition of the purified extract was also determined by the same method.

The table gives the organic material, the time that the organic materials remained stable against oxidative deterioration without addition of the purified extract, the amount of purified extract mixed with the organic materials, and the time that the organic materials remained stable against oxidative deterioration with addition of the purified extract.

Table IV

| Organic Material | AOM Stability Without Addition of Purified Extract, Hours | Concentration of Purified Extract, Percent by Weight of the Organic Material | AOM Stability With Addition of Purified Extract, Hours |
| --- | --- | --- | --- |
| Lard | 4.0 | 0.05 | 74.0 |
| Do | 4.0 | 0.10 | 95.0 |
| Soybean Oil | 6.5 | 0.10 | 11.0 |
| Hydrogenated Soybean Oil | 62.5 | 0.10 | 155.0 |
| Cottonseed Oil | 10.5 | 0.10 | 27.5 |
| Hydrogenated Lard | 26.0 | 0.10 | 103.0 |

EXAMPLE VI

This example will give indication of the antioxidative effect of a purified extract of dried Osage orange fruit in the presence of various synergists on organic material subject to oxidative deterioration.

Purified extract of dried Osage orange fruit prepared as described in Example V was admixed in the amount of 0.1% by weight with nine samples of lard warmed to the liquid state, and thereafter to each sample was added a different synergist in the amount of 0.005% by weight of the sample. The same synergists were each added in the amount of 0.005% by weight to nine other samples of the lard. To another sample of the lard was added 0.1% by weight of the purified extract of the Osage orange fruit. All of these samples, plus a sample of the untreated lard, were measured by the Active Oxygen Method for their stability against oxidative deterioration.

The table gives the synergist, the time that the lard admixed with the synergist remained stable against oxidative deterioration, and the time that the lard admixed with the purified extract and the synergist remained stable against oxidative deterioration.

*Table V*

| Synergist | AOM Stability of Lard Admixed With Synergist, Hours | AOM Stability of Lard Admixed With Purified Extract and Synergist, Hours |
| --- | --- | --- |
| None | 4.0 | 95.0 |
| Tartaric Acid | 6.0 | 114.5 |
| Pyruvic Acid | 5.5 | 96.0 |
| Phosphoric Acid | 6.0 | 104.0 |
| Oxalic Acid | 6.5 | 114.5 |
| l-Malic Acid | 5.0 | 107.0 |
| Fumaric Acid | 6.0 | 95.5 |
| Citric Acid | 5.5 | 112.0 |
| D-Isoascorbic Acid | 5.5 | 116.0 |
| Ascorbic Acid | 5.5 | 116.0 |

Having thus described my invention, it will be understood that such description has been given by way of illustration and example and not by way of limitation, reference for the latter purpose being had to the appended claims.

I claim:

1. A process for preparing an antioxidative substance for organic materials subject to oxidative deterioration comprising drying Osage orange fruit by heating to a temperature of at least 60° C., extracting said dried Osage orange fruit with a solvent capable of dissolving fats, and recovering the resulting solution of extract containing said antioxidative substance.

2. A process for preparing an antioxidative substance for organic materials subject to oxidative deterioration comprising drying Osage orange fruit by heating said fruit to a temperature of at least 60° C., extracting said dried fruit with a solvent in which fats are soluble, recovering the resulting solution of extract, and thereafter separating the solvent from the extract containing said antioxidative substance.

3. A process for preparing an antioxidative substance for organic materials subject to oxidative deterioration comprising drying Osage orange fruit by heating said fruit to a temperature of at least 60° C., extracting said dried fruit with a solvent in which fats are soluble, recovering the resulting solution of extract, separating said solvent from said extract, redissolving said extract in a solvent in which fats are soluble to form a solution of said extract, and crystallizing said extract from said solution.

4. The process for retarding oxidative deterioration of an organic material subject thereto which comprises admixing with said material an added quantity of the fat-soluble portion of Osage orange fruit, which fruit has been dried by heating to a temperature of at least 60° C.

5. The process for retarding oxidative deterioration of an organic material subject thereto which comprises admixing with said material an added quantity of Osage orange fruit, which fruit has been dried by heating to a temperature of at least 60° C.

6. The process for retarding oxidative deterioration of an organic material subject thereto which comprises admixing with said material an added quantity of an extract soluble in fats of Osage orange fruit, which fruit has been dried by heating to a temperature of at least 60° C.

7. The process for retarding oxidative deterioration of an organic material subject thereto which comprises admixing with said material an added quantity of an antioxidative substance derived by drying Osage orange fruit by heating to a temperature of at least 60° C., extracting said dried Osage orange fruit with a solvent in which fats are soluble, and recovering the resulting solution of extract containing the antioxidative substance.

8. An organic material subject to oxidative deterioration containing admixed therewith an added quantity of a fat-soluble antioxidative substance derived from Osage orange fruit, which fruit has been dried by heating to a temperature of at least 60° C., and an added quantity of a synergist selected from the group consisting of tartaric acid, pyruvic acid, phosphoric acid, oxalic acid, l-malic acid, fumaric acid, citric acid, d-isoascorbic acid, and ascorbic acid.

9. The process for retarding oxidative deterioration of an organic material subject thereto which comprises admixing with said material an added quantity of the fat-soluble portion of Osage orange fruit, which fruit has been dried by heating to a temperature of at least 60° C., and an added quantity of a synergist selected from the group consisting of tartaric acid, pyruvic acid, phosphoric acid, oxalic acid, l-malic acid, fumaric acid, citric acid, d-isoascorbic acid, and ascorbic acid.

References Cited in the file of this patent

UNITED STATES PATENTS 2,550,261    Jensen _____ Apr. 24, 1951